United States Patent [19]
Tsuda et al.

[11] Patent Number: 5,663,826
[45] Date of Patent: Sep. 2, 1997

[54] TRANSMISSION TYPE LIQUID CRYSTAL MASK MARKER

[75] Inventors: Yukihiro Tsuda, Isehara; Taku Yamazaki, Hiratsuka; Akira Mori, Chigasaki; Yukinori Matsumura, Isehara, all of Japan

[73] Assignee: Komatsu Ltd., Tokyo, Japan

[21] Appl. No.: 619,546

[22] PCT Filed: Sep. 26, 1994

[86] PCT No.: PCT/JP94/01574

§ 371 Date: Apr. 1, 1996

§ 102(e) Date: Apr. 1, 1996

[87] PCT Pub. No.: WO95/09067

PCT Pub. Date: Apr. 6, 1995

[30] Foreign Application Priority Data

Sep. 30, 1993 [JP] Japan ................................. 5-269966
Nov. 19, 1993 [JP] Japan ................................. 5-312876

[51] Int. Cl.⁶ ................................................. G02B 26/08
[52] U.S. Cl. ........................... 359/202; 359/201; 347/255
[58] Field of Search ............................. 359/201, 202, 359/216, 900; 347/246, 255, 110; 345/87, 98, 99; 219/121.61, 121.67–121.69, 121.73

[56] References Cited

U.S. PATENT DOCUMENTS 5,309,273  5/1994  Mori et al. ............................ 359/202

FOREIGN PATENT DOCUMENTS 64-11088   1/1989  Japan.
5-42379    2/1993  Japan.
6-39577    2/1994  Japan.
94/26457  11/1994  WIPO.

OTHER PUBLICATIONS

A. Yariv: Basis of Photoelectronics, p. 400, Maruzen (1988).

*Primary Examiner*—James Phan
*Attorney, Agent, or Firm*—Sidley & Austin

[57] ABSTRACT

The present invention relates to a transmission type liquid crystal mask marker which can be incorporated easily into a conventional apparatus, and which enables high-speed and high-accuracy stable printing and an increase in the S/N ratio of a sensor output. The transmission type liquid crystal mask marker thus includes a controller for, during rewriting a static marking image displayed on a transmission type liquid crystal mask, displaying a static test image and attaining an equipotential state, and thereafter repeatedly displaying the static marking image and attaining an equipotential state up to the end of the rewriting time, measuring an actual light transmittance of the static test image during rewriting, and regulating the voltage applied to the transmission type liquid crystal mask so that the actual light transmittance is equal to the optimum light transmittance. An optical filter can be provided on a light receiving device for measuring a light transmittance.

20 Claims, 6 Drawing Sheets

N : PREDETERMINED NUMBER OF TIMES TEST IMAGE IS DISPLAYED
n : NUMBER OF TIMES TEST IMAGE IS DISPLAYED
$t_2$: REWRITING TIME
t : ELAPSED TIME
* : INPUT OF INTENSITY OF RECEIVED LIGHT R2
(*): POSSIBLE TO INPUT INTENSITY OF RECEIVED LIGHT R2

TRANSMISSION TYPE LIQUID CRYSTAL MASK MARKER

FIELD OF THE INVENTION

The present invention relates to a transmission type liquid crystal mask marker, and particularly to a transmission type liquid crystal mask marker suitable for printing on a workpiece which is required to have high accuracy.

BACKGROUND ART

A transmission type liquid crystal mask marker is adapted for printing various static images on a surface of a workpiece by applying a high-density energy beam, such as a laser beam, to a transmission type liquid crystal mask (referred to as "a liquid crystal mask" hereinafter unless otherwise stated) on which the various static images are displayed, so as to apply to the workpiece surface the beam which has passed through a static image. In general, only static images for a mark are displayed on the liquid crystal mask of such a transmission type liquid crystal mask marker.

One of the inventors of the present invention has previously made a proposal for maintaining the printing performance of a transmission type liquid crystal mask marker (refer to Japanese Patent Laid-Open (a)6-39577. This proposal (referred to as "first proposal" hereinafter) has been made in consideration of the facts that the light transmittance of a transmission type liquid crystal mask increases as the temperature increases and deterioration proceeds, thereby decreasing printing accuracy, and that the light transmittance of a transmission type liquid crystal mask can be controlled by regulating a driving voltage. In this proposal, a light emitting element and a light receiving element are added to a conventional transmission type liquid crystal mask marker (if required, a liquid crystal mask temperature sensor is also added), and the following program is also provided on a controller. Namely, light from the light emitting element is applied to a static test image on the liquid crystal mask, and the transmitted light is received by the light receiving element so that an actual light transmittance Q is computed from the intensity of the emitted light R1 and the intensity of the received light R2. The applied voltage for a static image is regulated so that the actual light transmittance Q is equal to an optimum light transmittance Qo at the operation temperature. It is thus possible to maintain the printing performance of various conventional transmission type liquid crystal mask markers.

However, the first proposal also has a new problem with respect to matching with a transmission type liquid crystal mask marker which has recently appeared and which has the performance of high-accuracy and high-speed continuous printing.

The assignee of the present invention has also proposed a transmission type liquid crystal mask marker comprising a YAG laser mask marker (refer to Japanese Patent Laid-Open (A) 5-42379). This proposal (referred to as "second proposal" hereinafter) comprises a first XY deflecting device and a second XY deflecting device, which are provided in front of and behind a liquid crystal mask, respectively. A controller previously stores each of the divided static images of the whole image which is divided, and successively displays the divided static images on the liquid crystal mask. A laser beam scans the divided static images by the first XY deflecting device, and the laser beam passed through each of the divided static images is deflected by the second XY deflecting device and applied to the workpiece surface to complete the entire printing. As a result, high-accuracy and high-speed continuous printing is achieved.

However, a transmission type liquid crystal mask marker such as the second proposal, which enables high-accuracy and high-speed continuous printing, has difficulties in timing (time matching) with the first proposal. Namely, it is necessary to investigate a new problem with respect to timing.

On the other hand, a transmission type liquid crystal mask marker, e.g., a YAG laser mask marker, is sometime provided with one of various sensors serving as a light receiving element. A silicon photodiode is frequently used as a light receiving unit of the liquid receiving element in consideration of the cost, quality, temperature characteristics and compatibility with a light emitting element. As shown in FIG. 6, the sensitivity A of the silicon photodiode within the wavelength region (1.06 μm) of a YAG laser is lower than the sensitivity within a shorter wavelength region (for example, refer to A. Yariv: Basis of Photoelectronics, P. 400, Maruzen (1988)). For example, when a semiconductor laser (wavelength of about 800 nm) or a He—Ne laser (wavelength of 633 man), which has high energy density, is used as the light emitting element, the sensitivity of the YAG laser is as low as about ⅒ of the sensitivity of such a semiconductor laser. Therefore, when a short-wavelength laser is used as the light emitting element, the effects on the light receiving unit can be relatively decreased, thereby preventing the problem with respect to a S/N ratio (signal/noise ratio), even if the YAG laser beam is scattered.

However, in a transmission type liquid crystal mask marker comprising a YAG laser using a Q switch or a pulse oscillation YAG laser, a laser pulse has high peak power. Although this peak power depends upon the operation conditions of the YAG laser or the structure of the YAG laser mask maker, the peak power is generally not less than 1 kW. The intensity of the scattered YAG laser beam, which is applied to the light receiving unit, is increased depending upon the arrangement of the light receiving unit of the light receiving element. As a result, noise occurs in the sensor output (the output of the light receiving element) due to the YAG laser beam, and the S/N ratio of the detection system of the light receiving element is thus decreased, thereby making unstable the operation of the YAG laser mask marker and deteriorating printing accuracy. In an extreme case, there are the problems that a sensing operation is made impossible, and that an error occurs in the operation of the YAG laser mask marker.

SUMMARY OF THE INVENTION

The present invention has been achieved for solving the above problems of the prior systems, and an object of the present invention is to provide a transmission type liquid crystal mask marker which enables the incorporation of a program for maintaining printing accuracy into a conventional transmission type liquid crystal mask marker, and which enables stable printing with high precision.

A transmission type liquid crystal mask marker according to the present invention comprises:

a light emitting means and a light receiving means which are connected to a controller, and a transmission type liquid crystal mask to which a voltage is applied from the controller to successively rewrite and display various static marking images and to appropriately display a static test image;

wherein the light emitting means is a light emitting means for applying light to a displayed static test image;

wherein the light receiving means is a light receiving means for receiving the light passed through the static test image;

wherein the controller is a controller for previously storing an optimum light transmittance;

wherein, during a rewriting of at least one of the static marking images, the displaying of the static test image is performed and then an equipotential state of all common terminals and segment terminals of the transmission type liquid crystal mask is attainted, in that order, at least once; and after which the displaying of a static marking image is performed and then an equipotential state is attained, in that order, at least once, up to the termination of the rewriting time so as to finally attain an equipotential state;

wherein the intensity of received light is inputted from the light receiving element during the displaying of the static test image;

wherein the actual light transmittance of the transmission type liquid crystal mask is computed from the intensity of the received light and the intensity of the emitted light; and wherein a voltage for a static image applied to the transmission type liquid crystal mask is regulated.

In addition, the image area of the static test image is larger than the incident area of the light emitted from the light emitting means, at least on the surface of the liquid crystal mask. Further, the light receiving means can be a light receiving means comprising a light receiving unit, having a silicon pn junction for receiving the light passed through the static test image, and an optical filter which is provided on a light receiving window of the light receiving unit so that it does not transmit a YAG laser beam but transmits the above light.

In the above-described construction, during rewriting of various static marking images (printing images) on the liquid crystal mask, the static test image (the image for measuring light transmittance) and each of the various static marking images are displayed at least once. In the displaying (displaying during rewriting), the actual light transmittance of the static test image is measured and compared with the optimum light transmittance so as to control the voltage for a static image applied to the liquid crystal. The applied voltage for a static image, of course, represents the applied voltage for the static test image and the applied voltage for a static marking image.

On the other hand, during rewriting, all common terminals and segment terminals of the liquid crystal mask are made equipotential (referred to as "the attaining of an equipotential state" hereinafter) immediately after the static test image is displayed, thereby removing substantially all afterimages. The displaying of the static test image and the attaining of an equipotential state are performed at least once. However, the liquid crystal mask has the characteristic that the actual light transmittance increases as the application time of the voltage for displaying a static image increases. Therefore, in the present invention, the application of a voltage for a long time easily makes unstable the measurement of the actual light transmittance. When the attaining of an equipotential state is performed after the static test image is displayed for a short time, therefore, a stable light transmittance is obtained. Even with the attaining of an equipotential state having the above effect, if the displaying time is increased, the rising time of a static image on the liquid crystal mask is increased, thereby causing difficulties in high-speed printing.

In the present invention, therefore, after the static test image is displayed and an equipotential state is attained, the same static image as a static marking image, which is displayed after the termination of the rewriting time, is displayed and an equipotential state is attained. The displaying of a static marking image and the attaining of an equipotential state are performed at least once up to the termination of the rewriting time so as to finally attain an equipotential state. As a result, an afterimage of the static test image is securely erased, and a smooth rapid start of the displaying of the next static marking image can be secured after the termination of the rewriting time. The static marking image which is displayed during the rewriting, of course, represents an image having the same content as a first static marking image which is displayed after the termination of the rewriting time. It can thus be thought that the final displayed static marking image is left as it is, after the termination of the rewriting time, and is used as the next static marking image. In this thinking, the rewriting time should be considered to start before the displaying of the final static marking image, i.e., at the termination of the final attaining of an equipotential state. As described above, the displaying of the static test image and a static marking image during rewriting enables incorporation into the first and second proposals, and the maintenance of good printing accuracy and high printing speed.

In addition, since the image area of the static test image is larger than the incident area of the light emitted from the light emitting means, the intensity of the emitted light and the intensity of the received light are accurately obtained, and good printing accuracy is maintained. Further, since the optical filter is provided on the light receiving means so as to shield the YAG laser beam (for printing) and to transmit the light emitted from the light emitting means, the noise caused by the YAG laser can be removed, thereby enabling high-accuracy and high-speed printing.

BEST MODE FOR CARRYING OUT THE INVENTION

Transmission type liquid crystal mask markers in accordance with preferred embodiments of the present invention are described with reference to the attached drawings.

Figure 3:
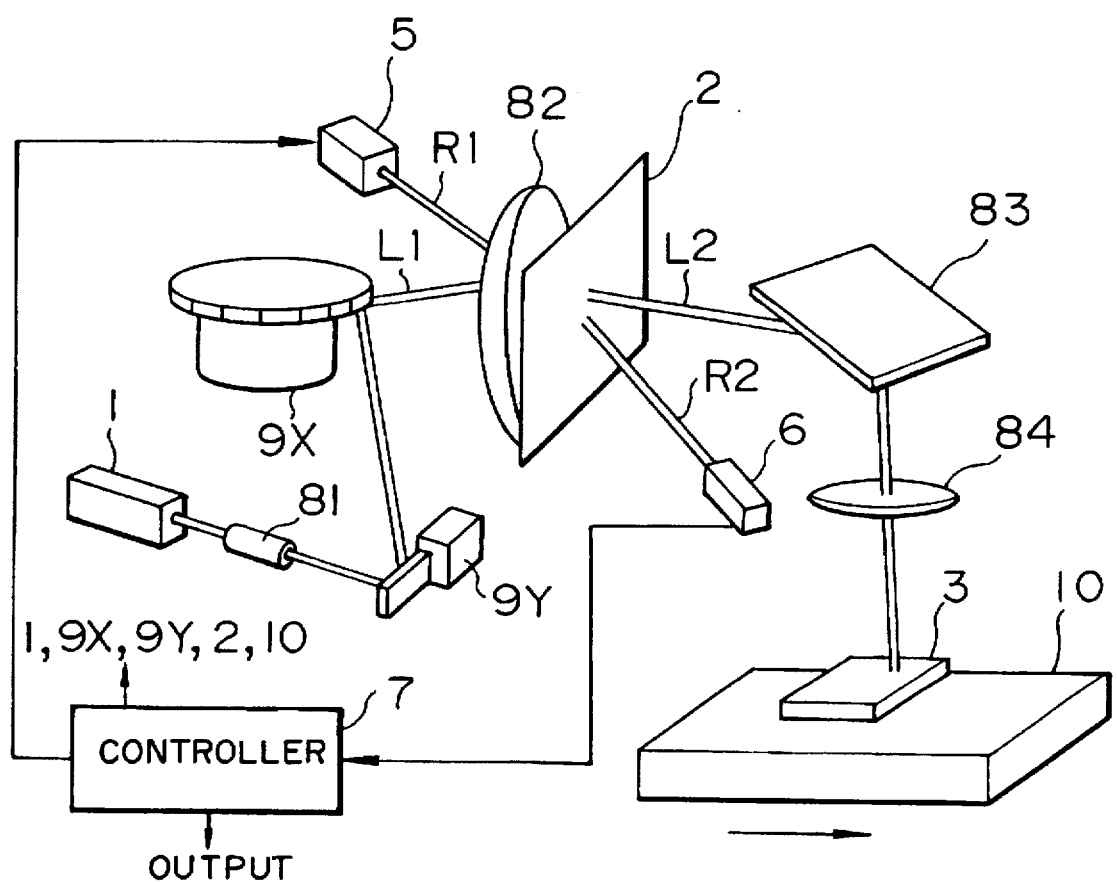
FIG. 3 is a drawing illustrating the hardware configuration of a transmission type liquid crystal mask marker in accordance with the first embodiment.

Referring to FIG. 3, showing the hardware, configuration of a first embodiment, the laser beam L1, which is emitted from a laser oscillator 1, is first deflected to the direction Y by a galvanoscanner 9Y through a beam shaping device 81. The laser beam L1 is then deflected to the direction X by a polygon mirror 9X and applied to a converging lens 82. The converging lens 82 converges the laser beam L1 at substantially one point on a reflecting mirror 83, and, at the same time, scans a static marking image on a transmission type liquid crystal mask 2. The, transmitted laser beam L2, which is transmitted through the transmission type liquid crystal mask 2 and which contains information of a static marking image, is deflected by a reflecting mirror 83, and is applied through an objective lens 84 to a surface of a workpiece 3 on a work feeder 10. This irradiation marks a static marking image on the surface of the workpiece 3. In the above-described configuration, the driving systems of the laser oscillator 1, the X deflecting device 9X, the Y deflecting device 9Y, the liquid crystal mask 2, and the work feeder 10 are electrically connected to the controller 7 so as to be synchronously controlled by the controller 7.

A static test image, other than a static marking image, is appropriately displayed on the liquid crystal mask 2 by applying a voltage from the controller 7. A light emitting element 5, serving as light emitting means, and a light receiving element 6, serving as light receiving means, are also provided. The light receiving element 6 receives the light emitted from the light emitting element 5 and passed through the static test image, which is displayed on the liquid crystal mask 2, and outputs to the controller 7 the intensity of the received light R2. It is thus preferable that the area of the static test image is larger than the incident area of the light emitted from the light emitting element 5, at least on the surface of the liquid crystal mask 2. The light emitting element 5 and the light receiving element 6 are electrically connected to the controller 7 to be synchronously controlled by the controller 7. The controller 7 previously stores an optimum light transmittance Qo and the intensity of the emitted light R1, emitted from the light emitting element 5. The optimum light transmittance Qo is a value which is previously stored in the controller 7 on the basis of the measurements of the characteristics of the transmission type liquid crystal mask 2 of the transmission type liquid crystal mask marker in ordinary use.

Figure 1:
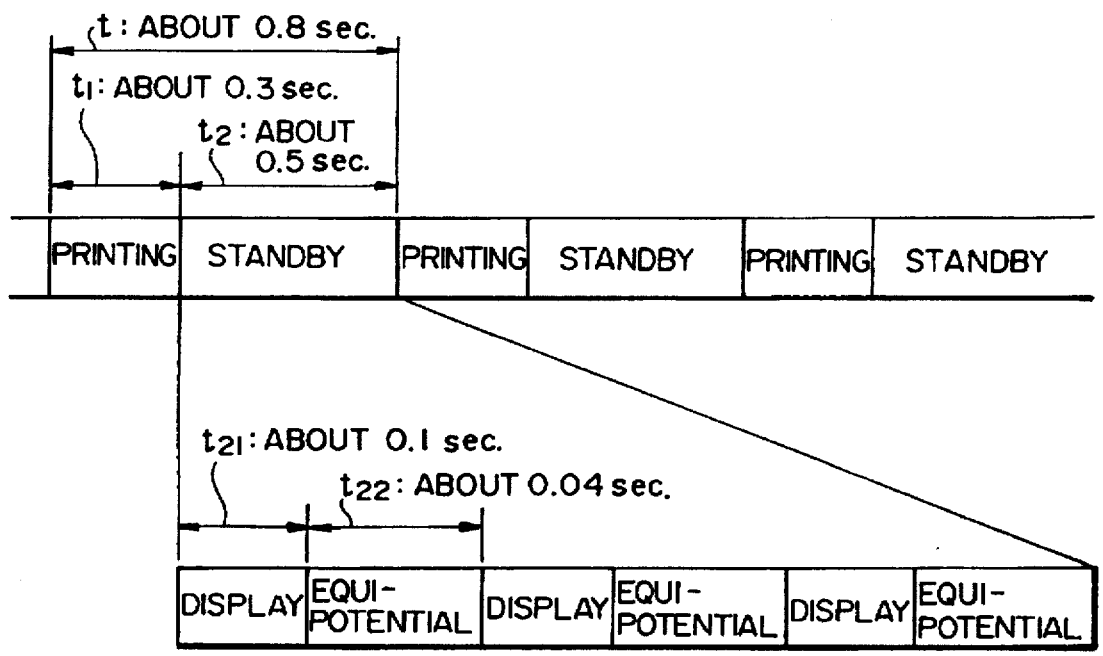
FIG. 1 is a time chart showing the outline of a marking cycle and the outline of the repetition of interrupt displaying in accordance with a first embodiment of the present invention.
Figure 2:
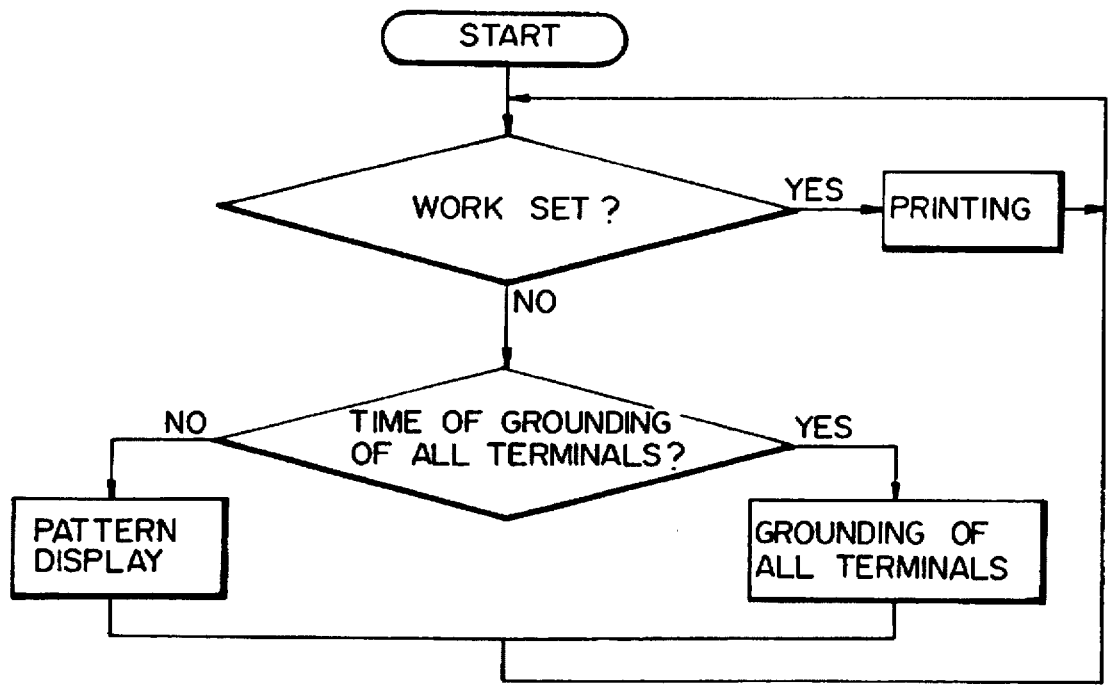
FIG. 2 is a flowchart in accordance with the first embodiment.

The software configuration of the first embodiment is described below. As shown in FIG. 1, this embodiment relates to a transmission type liquid crystal mask marker of high-accuracy and high-speed continuous printing type having a printing cycle t of about 0.8 second. The printing cycle t includes a displaying time (printing time) t1 of a static marking image of about 0.3 second, and a workpiece standby time (the time of movement and fixing at the printing position of a workpiece) t2 of about 0.5 second. In the workpiece standby time t2, i.e., the rewriting time t2, the interrupt displaying time t21 of the static test image or a static marking image is about 0.1 second. The time for making 0 v all common terminals and segment terminals of the liquid crystal mask 2 (i.e., grounding all terminals), or the time t22 for attaining an equipotential state after this interrupt displaying is about 0.04 second. In this embodiment, the displaying and the attaining of an equipotential state are repeated three times within the workpiece standby time t2. FIG. 2 is a flowchart showing the repetition.

Figure 4:
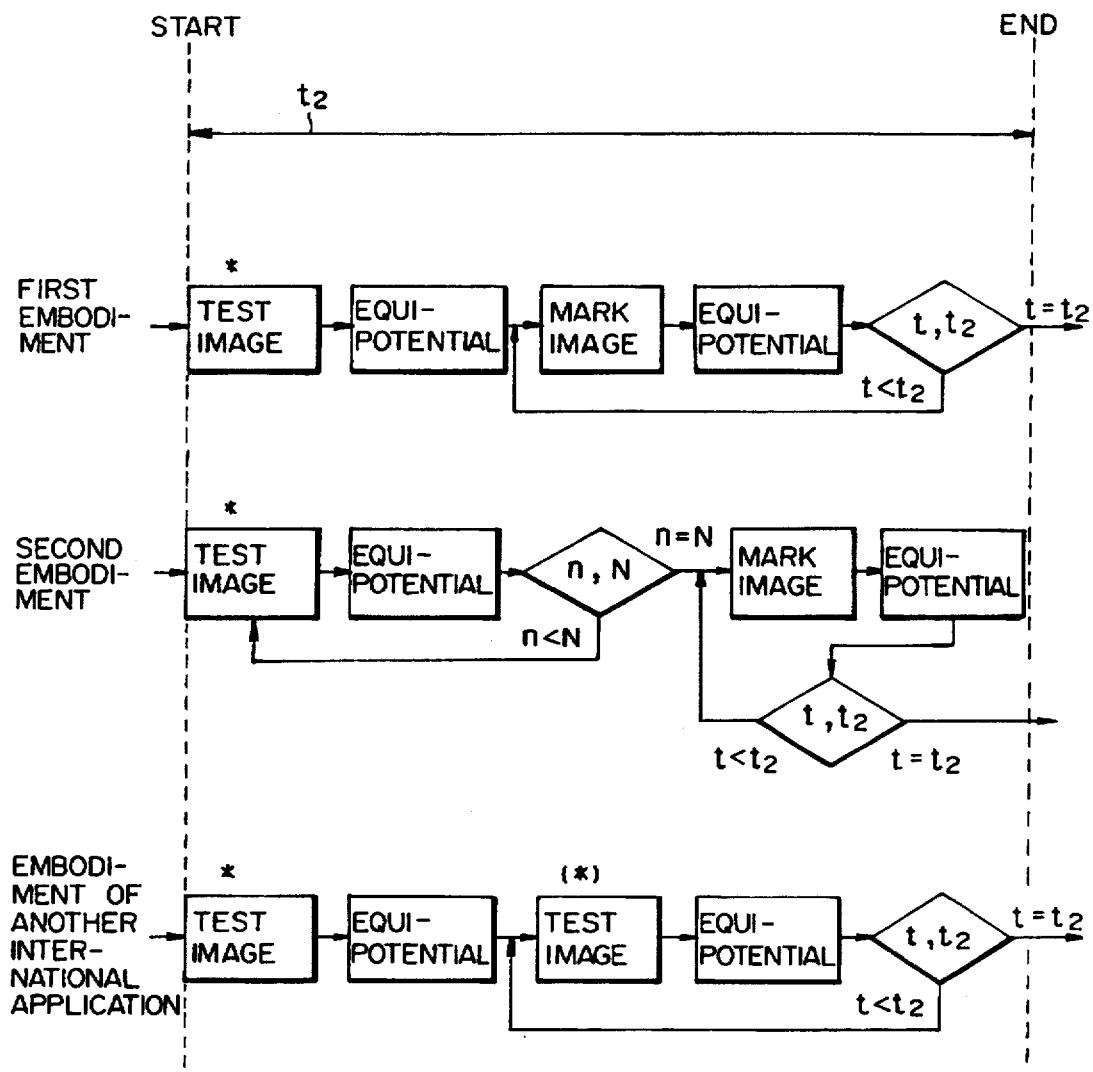
FIG. 4 is a time chart showing operations during a rewriting time in accordance with the first embodiment, a second embodiment and an embodiment of another application.

In the displaying and the attaining of an equipotential state in the first embodiment, the controller 7 first displays the static test image during the rewriting time t2, as shown in FIG. 4. The controller 7 inputs the intensity of the received light R2 from the light receiving means 6 during the displaying time t21 of about 0.1 second. The actual light transmittance of the transmission type liquid crystal mask 2 is computed from the intensity of the received light R2 and the intensity of the emitted light R1 of the light emitting means 5. The controller 7 controls the voltage for a static image applied to the liquid crystal mask 2 so that the actual light transmittance Q is equal to the optimum light transmittance Qo. After the elapse of the displaying time t21, all terminals are made 0 V to attain an equipotential state. After this attaining of an equipotential state, the same static image as the first static marking image after the termination of the rewriting time t2 is displayed, and then an equipotential state is attained. After this attaining of an equipotential state, the elapsed time t from the start of rewriting is compared with the rewriting time t2. If t <t2, the displaying of the static test image, and the attaining of an equipotential state are repeated. If t=t2, i.e., if it is decided that the rewriting time is terminated, the next regular static marking image is displayed and printed.

Since the liquid crystal mask 2 is controlled to the optimum light transmission Qo by the above-described displaying and the attaining of an equipotential state, the next regular static marking image is printed on the work surface 3 with high accuracy. Since afterimages of the regular static marking image and the static test image are securely erased before the start of rewriting, the displaying of a regular static marking image after the end of rewriting can rapidly and smoothly be started. Although, in this embodiment, a static image is displayed three times, the static image can be displayed any desired number of times in accordance with the specifications of the body of the transmission type liquid crystal mask marker used.

A second embodiment of the present invention is described. In this embodiment, unlike the first embodiment, the displaying of the static test image and the attaining of an equipotential state are repeated a plurality of times. Drawings similar to FIGS. 1 and 3 of the first embodiment are not described.

In FIGS. 3 and 4, the controller 7 first displays the static test image and inputs the intensity of the received light R2 during the rewriting time t2. An equipotential state is then attained, and the number of times n that the static test image has been displayed is then compared with the predetermined number of times N that the static test image is to be displayed. If n<N, the displaying of the static test image and the attaining of an equipotential state are repeated. If n=N, the same static image as the first static marking image after the end of the rewriting time t2 is displayed. After this displaying, an equipotential state is finally attained at the end of the rewriting time t2, as in the first embodiment.

The second embodiment enables the erasing of afterimages, the stabilization of the intensity of the received light R2, and a more rapid and smoother start of the displaying of the next regular static marking image. Although, in this embodiment, the number of times a static image is displayed is three, the number of times of displaying can be set to any number according to demand. For example, if the number of times of displaying is five, the two times of earlier displaying can be performed for the static test image, and the three times of later displaying can be performed for a static marking image. It is a matter of course that the number of times of earlier displaying and the number of times of later displaying can be reversed. Although the static test image is displayed a plurality of times N, the intensity of the received light R2 can be inputted to the controller 7 at least once.

As is obvious from the first and second embodiments, when the controller having the aforementioned program is applied to a conventional transmission type liquid crystal mask marker, a program for maintaining printing accuracy can be incorporated without any difficulties. There is thus no need to change the configuration of the bodies of the transmission type liquid crystal mask marker and the work feeder. In addition, since the static test image is displayed at a high speed, each of the embodiments is a help to the increasing of the printing speed and the printing accuracy by increasing the operation speed of the conventional transmission type liquid crystal mask marker and the work feeder body. As a result, it is possible to maintain and further improve the high printing speed and printing accuracy, thereby permitting an attempt to increase the throughput.

Another embodiment proposed by the assignee of the present invention is described in international application No. PCT/JP94/00703. This embodiment has the same hardware configuration as the first embodiment of the present invention, but the software configuration is different in the displaying of a static image and the attaining of an equipotential state during the rewriting time. Namely, as shown in FIG. 4, the static test image is displayed at the start of rewriting, the intensity of the received light R2 is inputted from the light receiving means 6, and the voltage for a static image to be applied to the liquid crystal mask 2 is regulated so that the actual light transmittance Q is equal to the optimum light transmittance Qo. After the static test image is displayed, an equipotential state is attained, and the displaying of the static test image and the attaining of an equipotential state are repeated up to the termination of the rewriting time t2. As a result, any afterimages are erased, the intensity of the received light R2 (i.e., the actual light transmittance Q) is made stable, and the displaying of the next regular static marking image for printing is started at high speed.

In PCT/JP94/00703, the displaying of the static test image and the attaining of an equipotential state are repeated. However, in the present invention, after the displaying of the static test image and the attaining of an equipotential state are performed once, the displaying of a static marking image and the attaining of an equipotential state are repeated at least once. Since, in the present invention, the static test image and a static marking image are displayed, the start of a regular static marking image for printing is further improved, as compared with the PCT/JP94/00703.

A transmission type liquid crystal mask marker in accordance with a third embodiment of the present invention is described below with reference to the attached drawings.

Figure 5:
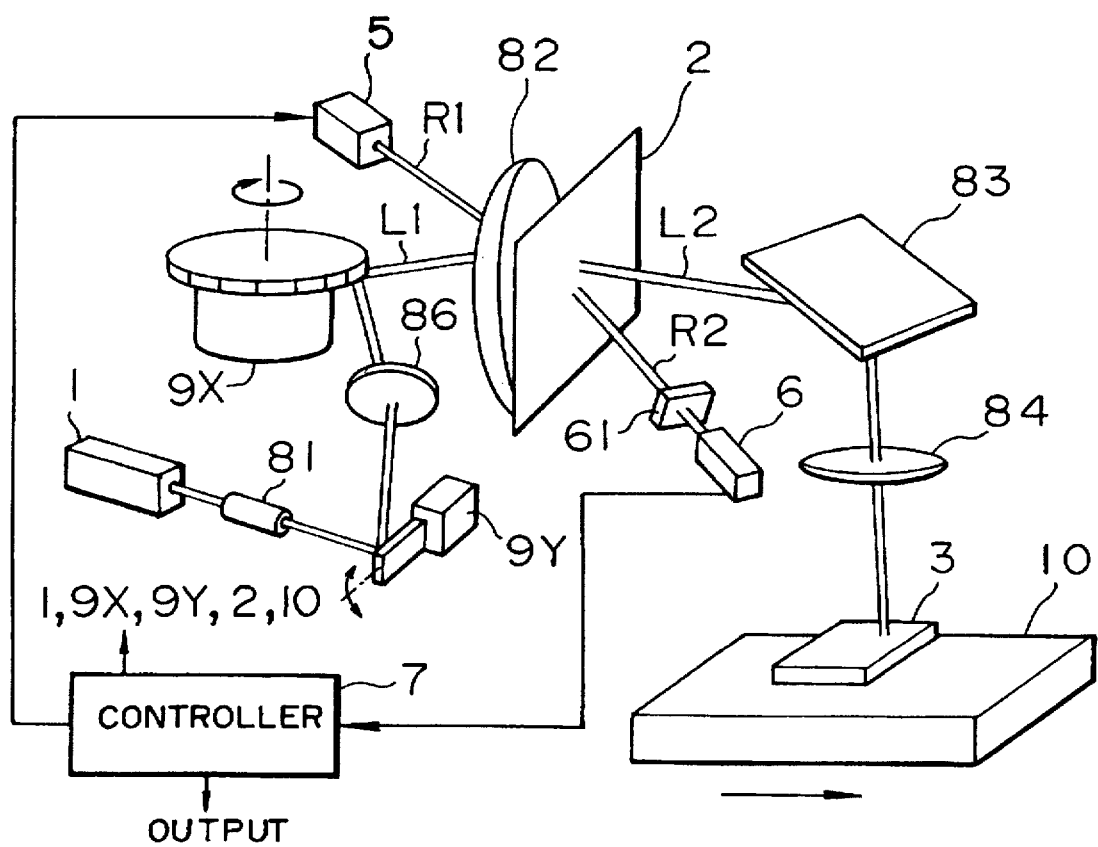
FIG. 5 is a drawing illustrating the hardware configuration of a transmission type liquid crystal mask marker in accordance with a third embodiment of the present invention.
Figure 6:
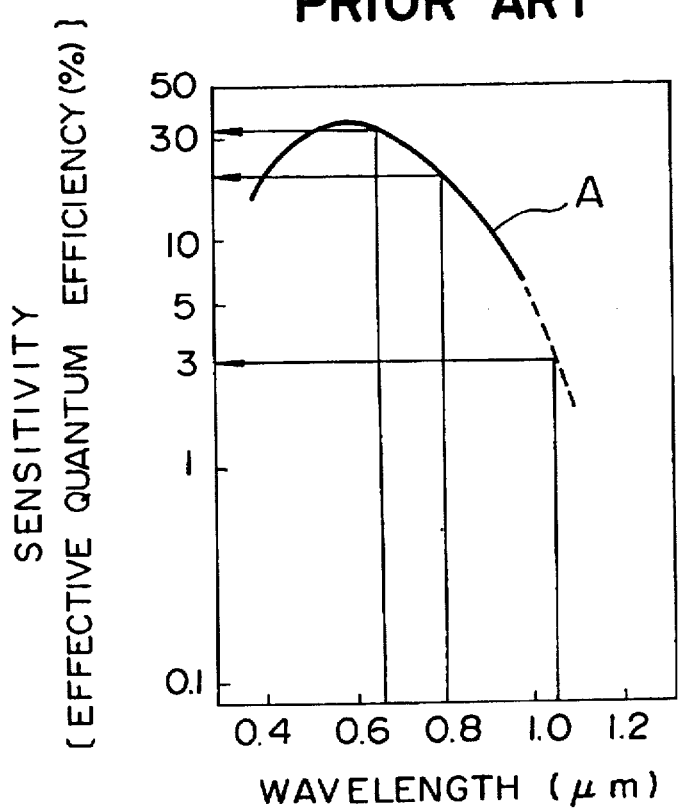
FIG. 6 is a graph showing the sensitivity characteristics of silicon photodiodes in accordance with prior systems.

FIG. 5 shows the hardware configuration of a transmission type liquid crystal mask marker comprising a YAG laser with a Q switch in accordance with the third embodiment. Points different from FIG. 1 of the first embodiment are described. The third embodiment is different from the first embodiment in the points that a deflecting lens 86 is provided between the galvanoscanner 9Y and the polygon mirror 9X, and that an optical filter 61 is provided on a light receiving window of the light receiving means 6, serving as the light receiving element. When the deflecting lens 86 is provided, the laser beam L1, deflected to the direction Y by the galvanoscanner 9Y, is deflected by the deflecting lens 86 and applied to substantially the same point on the polygon mirror 9X Since the irradiation point can be controlled within a narrow range, the thickness of the polygon mirror 9X can be decreased. It is thus possible to decrease the weight of the polygon mirror 9X, increase the operation speed of the polygon mirror 9X, and decrease the size thereof. The basic function is similar to the transmission type liquid crystal mask marker (refer to FIG. 1) without the deflecting lens 86. The laser beam L1 applied to the polygon mirror 9X is passed through the liquid crystal mask 2 for displaying a static marking image to print the image on the workpiece surface 3 at a high speed with high accuracy, as in the first embodiment.

The light receiving means 6 provided with the optical filter 61 is described below. The light receiving means 6 receives the transmitted light emitted from the light emitting means 5 as the light emitting element, and outputs the intensity of the received light R2 to the controller 7. The controller 7 computes the actual light transmittance Q from the intensity of the received light R2 and the intensity of the emitted light R1, and controls the voltage for a static image applied to the liquid crystal 2 so that the actual light transmittance Q equals to the optimum light transmittance Qo. As a result, constant image printing quality is maintained.

Figure 7:
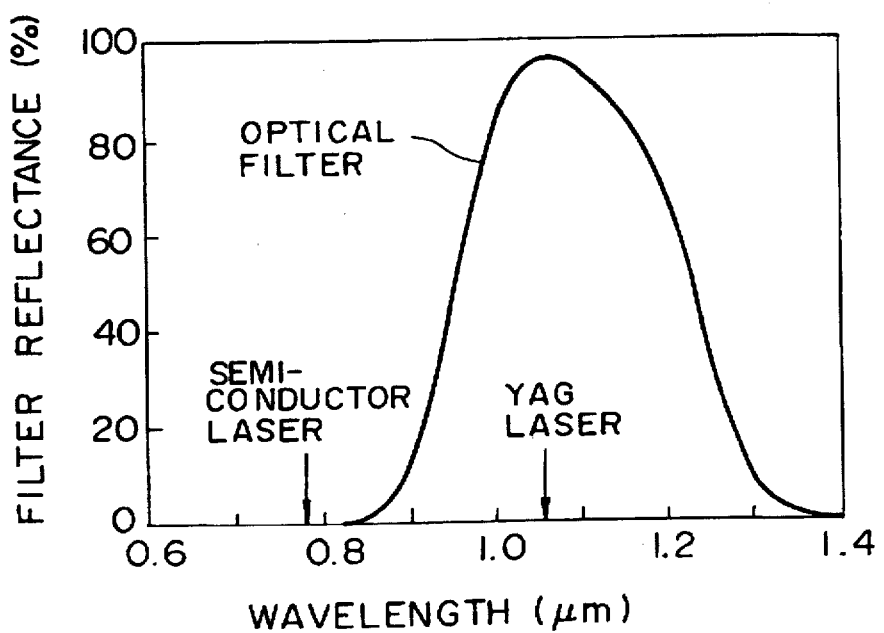
FIG. 7 is a chart showing the reflectance characteristics of an optical filter of a light receiving means in accordance with the third embodiment.

The light emitting means 5 comprises a semiconductor laser which oscillates with a wavelength of 780 nm, the light receiving unit of the light receiving means 6 comprises a silicon photodiode, and the optical filter 61 comprises a YAG laser deflecting filter. As shown in FIG. 7, the reflectance of the optical filter 61 within the wavelength region of the YAG laser is not less than 90% and the reflectance within the wavelength region of the semiconductor laser is substantially 0. Namely, the optical filter 61 does not transmit the YAG laser beam L (transmitted laser beam L2), but transmits the light R for measuring the light transmittance (the light with the intensity of the received light R2). The optical filter 61 is generally referred to as an "interference filter".

Figure 8A:
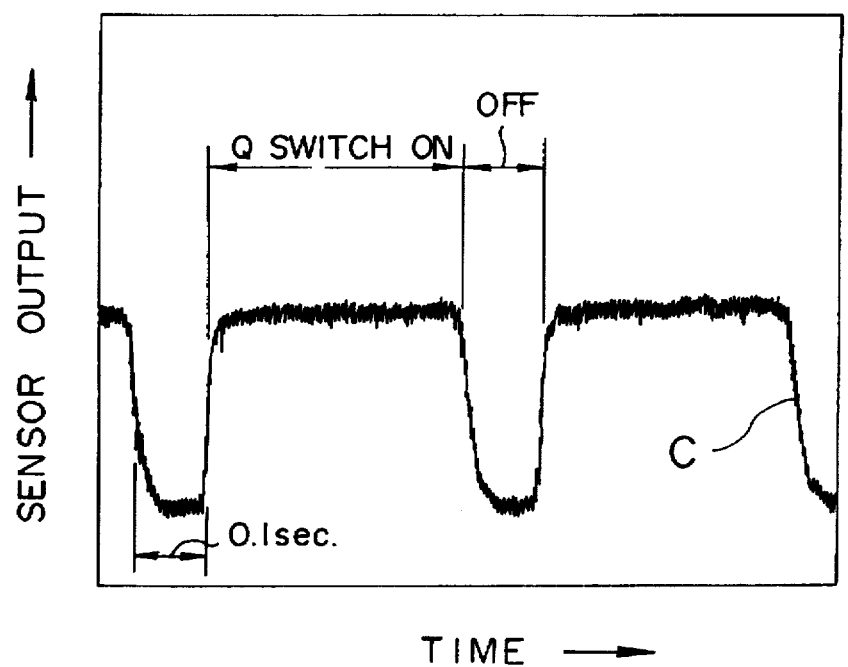
FIG. 8A is an oscilloscopic chart showing the effects of noise on the sensor output in accordance with the third embodiment.
Figure 8B:
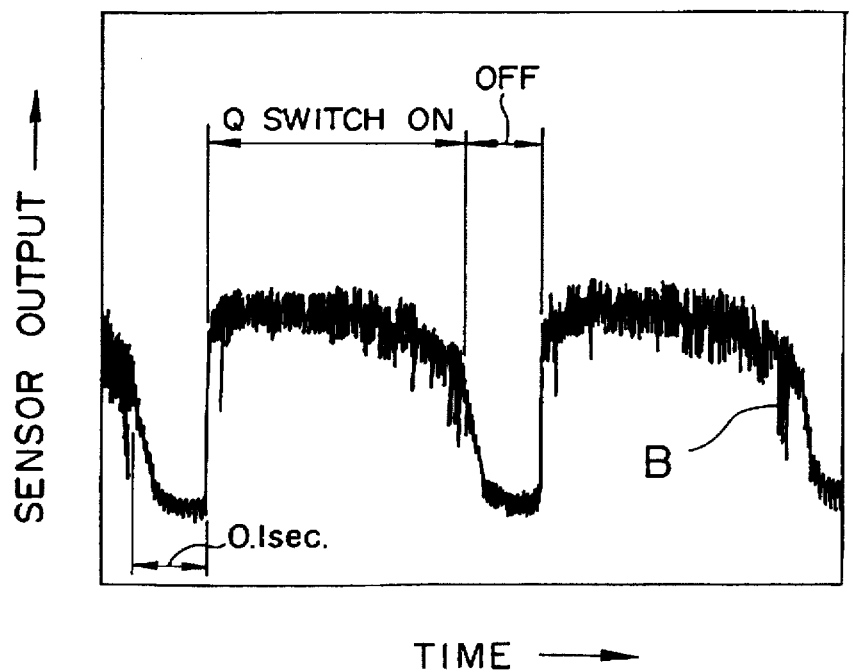
FIG. 8B is an oscilloscopic chart showing the effects of noise on the sensor output in accordance with prior art.

FIGS. 8A and 8B show data examples of the sensor output of this embodiment, provided with the optical filter 61, and the prior system (without the optical filter 61). Since the sensor output B (prior system) contains the large noise caused during emission of the YAG laser beam L, the output value is unstable, and the sensor output B is thus unsuitable for high-accuracy control. This is due to the noise caused by Q switch control of the YAG laser. However, noise is completely removed from the sensor output C of this embodiment, and the intensity of the received light R2 from the light emitting means 5 is stable. The transmission type light crystal mask marker is stably operated by the driving control based on the sensor output C with an excellent S/N ratio, thereby preventing operation error. The image marking quality can also be maintained in a high level. In addition, although the prior system has the need to decrease the effect of noise by disposing the optical sensor (the light receiving element) at a position where the YAG laser beam is hardly applied, this embodiment eliminates such a limit and thus increases the degree of freedom of arrangement.

INDUSTRIAL APPLICABILITY

The present invention can easily be applied to a conventional apparatus by only changing a program of the controller, and enables high-speed and high-accuracy stable printing, by smoothly starting the displaying of an image for printing while controlling the light transmittance of the liquid crystal mask to an optimum state, and an attempt to increase the throughput. The present invention is also useful as a transmission type liquid crystal mask marker which can remove noise by an optical filter to increase the S/N ratio of sensor output.

That which is claimed is:

1. A transmission liquid crystal mask marker comprising:

a laser oscillator for providing a laser beam;

a transmission liquid crystal mask adapted for successively rewriting and displaying various static marking images and for appropriately displaying a static test image in response to an applied voltage, wherein said transmission liquid crystal mask has common terminals and segment terminals; and a controller connected to said transmission liquid crystal mask for applying said voltage to said transmission liquid crystal mask for displaying the various static marking images so that the various static marking images are printed on a surface of a workpiece by applying the laser beam, which has been transmitted from said laser oscillator through said transmission liquid crystal mask onto the surface of said workpiece;

a light emitter connected to said controller and adapted to apply light to the static test image; and a light receiver connected to said controller and adapted to receive the light transmitted from the light emitter through the static test image, wherein said controller is adapted for previously storing an optimum light transmittance;

wherein, during a rewriting time for rewriting at least one of the various static marking images, said controller causes the displaying of a static test image and then causes all common terminals and segment terminals of said transmission liquid crystal mask to attain an equipotential state, in that order at least once, wherein, after the displaying of a static test image and the attainment of an equipotential state at least once, said controller causes the displaying of a static marking image and then causes all common terminals and segment terminals of said transmission liquid crystal mask to attain an equipotential state, in that order at least once, up to a termination of the rewriting time;

wherein the intensity of received light is inputted by said light receiver to said controller during the displaying of the static test image;

wherein said controller computes the actual light transmittance of said transmission liquid crystal mask from the intensity of the received light and the intensity of the emitted light emitted by said light emitter; and wherein said controller regulates said voltage so that the actual light transmittance equals the stored optimum light transmittance.

2. A transmission liquid crystal mask marker in accordance with claim 1, wherein, during a rewriting time for rewriting at least one of the various static marking images, said controller is adapted to cause the displaying of a static test image and then cause all common terminals and segment terminals of said transmission liquid crystal mask to attain an equipotential state, repeatedly in that order for a plurality of times.

3. A transmission liquid crystal mask marker in accordance with claim 1, wherein, after the displaying of a static test image and the attainment of an equipotential state at least once, said controller is adapted to cause the displaying of a static marking image and then cause all common terminals and segment terminals of said transmission liquid crystal mask to attain an equipotential state, in that order for a plurality of times, up to a termination of the rewriting time.

4. A transmission liquid crystal mask marker in accordance with claim 3, wherein, during a rewriting time for rewriting at least one of the various static marking images, said controller is adapted to cause the displaying of a static test image and then cause all common terminals and segment terminals of said transmission liquid crystal mask to attain an equipotential state, repeatedly in that order for a plurality of times.

5. A transmission liquid crystal mask marker in accordance with claim 4, wherein said laser oscillator provides a YAG laser beam; and wherein said light receiver comprises a light receiving unit having a silicon pn junction, for receiving light transmitted through the static test image, and an optical filter, which is provided on a light receiving window of said light receiving unit so that said optical filter does not transmit said YAG laser beam but transmits the light transmitted through the static test image.

6. A transmission liquid crystal mask marker in accordance with claim 4, wherein an image area, on the surface of said transmission liquid crystal mask, of the static test image is larger than an incident area of light emitted from said light emitter.

7. A transmission liquid crystal mask marker in accordance with claim 1, wherein an image area, on the surface of said transmission liquid crystal mask, of the static test image is larger than an incident area of light emitted from said light emitter.

8. A transmission liquid crystal mask marker in accordance with claim 7, wherein said laser oscillator provides a YAG laser beam; and wherein said light receiver comprises a light receiving unit having a silicon pn junction, for receiving light transmitted through the static test image, and an optical filter, which is provided on a light receiving window of said light receiving unit so that said optical filter does not transmit said YAG laser beam but transmits the light transmitted through the static test image.

9. A transmission liquid crystal mask marker in accordance with claim 1, wherein said laser oscillator provides a YAG laser beam; and wherein said light receiver comprises a light receiving unit having a silicon pn junction, for receiving light transmitted through the static test image, and an optical filter, which is provided on a light receiving window of said light receiving unit so that said optical filter does not transmit said YAG laser beam but transmits the light transmitted through the static test image.

10. A method for printing a mark on a surface of a workpiece, said mark being formed from a succession of a plurality of static marking images, said method comprising the steps of:

storing an optimum light transmittance;

directing a laser beam toward a transmission liquid crystal mask having common terminals and segment terminals;

applying a voltage to said transmission liquid crystal mask for successively rewriting and displaying various static marking images so that the laser beam is selectively transmitted by the transmission liquid crystal mask onto said surface of said workpiece to thereby print the various static marking images on said surface;

during a time of rewriting of at least one of said various static marking images:

applying said voltage to said transmission liquid crystal mask for appropriately displaying a static test image in response thereto, and then causing all of said common terminals and segment terminals to attain an equipotential state, in that order at least once;

applying light emitted from a light emitter to the thus displayed static test image;

detecting light transmitted from said light emitter through the thus displayed static test image; and after the displaying of a static test image and the attainment of an equipotential state at least once, causing the displaying of a static marking image and then causing all of said common terminals and segment terminals of said transmission liquid crystal mask to attain an equipotential state, in that order at least once, up to a termination of the time of rewriting;

calculating an actual light transmittance of said transmission liquid crystal mask from an intensity of the thus detected light and an intensity of the light emitted by said light emitter; and regulating said voltage so that the actual light transmittance equals the thus stored optimum light transmittance.

11. A method in accordance with claim 10, wherein the thus displayed static test image has an image area, on the surface of said transmission liquid crystal mask, which is larger than an incident area of light emitted from said light emitter.

12. A method in accordance with claim 10, wherein said laser beam is a YAG laser beam; and wherein said method further comprises filtering the light transmitted through the static test image so as to transmit the light from the light emitter while excluding said YAG laser beam from the step of detecting light transmitted from said light emitter through the thus displayed static test image.

13. A method in accordance with claim 10, wherein said steps of causing the displaying of a static marking image after the displaying of a static test image and the attainment of an equipotential state and then causing all of said common terminals and segment terminals of said transmission liquid crystal mask to attain an equipotential state comprise displaying the next one of said various static marking images in the succession to be printed on said surface and then causing all of said common terminals and segment terminals of said transmission liquid crystal mask to attain an equipotential state.

14. A method in accordance with claim 10, wherein said steps of causing the displaying of a static marking image after the displaying of a static test image and the attainment of an equipotential state and then causing all of said common terminals and segment terminals of said transmission liquid crystal mask to attain an equipotential state are repeated, in that order, a plurality of times during the time of rewriting.

15. A method in accordance with claim 10, wherein said steps of applying said voltage to said transmission liquid crystal mask for appropriately displaying a static test image in response thereto, and then causing all of said common terminals and segment terminals to attain an equipotential state, are repeated in that order a plurality of times during the time of rewriting.

16. A method in accordance with claim 15, wherein said steps of causing the displaying of a static marking image after the displaying of a static test image and the attainment of an equipotential state and then causing all of said common terminals and segment terminals of said transmission liquid crystal mask to attain an equipotential state are repeated, in that order, a plurality of times during the time of rewriting.

17. A method in accordance with claim 16, wherein said steps of causing the displaying of a static marking image after the displaying of a static test image and the attainment of an equipotential state and then causing all of said common terminals and segment terminals of said transmission liquid crystal mask to attain an equipotential state comprise displaying the next one of said various static marking images in the succession to be printed on said surface, and then causing all of said common terminals and segment terminals of said transmission liquid crystal mask to attain an equipotential state.

18. A method in accordance with claim 17, wherein the thus displayed static test image has an image area, on the surface of said transmission liquid crystal mask, which is larger than an incident area of light emitted from said light emitter.

19. A method in accordance with claim 17, wherein said laser beam is a YAG laser beam; and wherein said method further comprises filtering the light transmitted through the static test image so as to transmit the light from the light emitter while excluding said YAG laser beam from the step of detecting light transmitted from said light emitter through the thus displayed static test image.

20. A method in accordance with claim 19, wherein the thus displayed static test image has an image area, on the surface of said transmission liquid crystal mask, which is larger than an incident area of light emitted from said light emitter.

* * * * *